United States Patent
Yellapragada et al.

(10) Patent No.: US 9,921,918 B1
(45) Date of Patent: Mar. 20, 2018

(54) CLOUD-BASED DATA BACKUP AND MANAGEMENT

(71) Applicant: CA, Inc., Islandia, NY (US)

(72) Inventors: Venkata Subrahmanya Sarma Yellapragada, Hyderabad (IN); Vijaya Kumar Pothireddy, Hyderabad (IN); Umasankar Raju Yallamraju, Hyderabad (IN); Avi Khinvasara, Secunderabad (IN)

(73) Assignee: CA, Inc., Islandia, NY (US)

( * ) Notice: Subject to any disclaimer, the term of this patent is extended or adjusted under 35 U.S.C. 154(b) by 515 days.

(21) Appl. No.: 14/015,271

(22) Filed: Aug. 30, 2013

(51) Int. Cl.
*G06F 7/00* (2006.01)
*G06F 17/00* (2006.01)
*G06F 11/14* (2006.01)

(52) U.S. Cl.
CPC .................. *G06F 11/1448* (2013.01)

(58) Field of Classification Search
CPC ........... G06F 17/30067; G06F 11/1448; H04L 12/1859; G06Q 10/06375
USPC .................. 707/641, 645, 646, 647, 695
See application file for complete search history.

(56) References Cited

U.S. PATENT DOCUMENTS

| | | | |
|---|---|---|---|
| 6,321,239 B1* | 11/2001 | Shackelford | 711/205 |
| 6,970,987 B1 | 11/2005 | Ji et al. | |
| 2008/0256140 A1* | 10/2008 | Lazzaro | G06F 11/1451 |
| 2012/0054746 A1 | 3/2012 | Vaghani et al. | |
| 2013/0198439 A1* | 8/2013 | Kurotsuchi et al. | 711/103 |

* cited by examiner

*Primary Examiner* — Md. I Uddin
(74) *Attorney, Agent, or Firm* — Pillsbury Winthrop Shaw Pittman LLP

(57) ABSTRACT

Systems and methods are provided to manage a storage object in a data backup storage mechanism, which stores multiple versions of a data file received from a data source. To efficiently manage storage in the storage object, determinations may be made as to whether a number of free data blocks (i.e., data blocks available for re-use) of the storage object exceeds a threshold and whether a data block(s) of the data file corresponding to a valid data block(s) of the storage object has not been modified in at least a number of previous versions of the data file. Responsive to a result of one or both of these determinations, data in the valid data block(s) may be copied to unused data block(s) in another storage object, and the status of the valid data block(s) is updated to free data block(s) such that all blocks in the storage object are free data blocks.

29 Claims, 6 Drawing Sheets

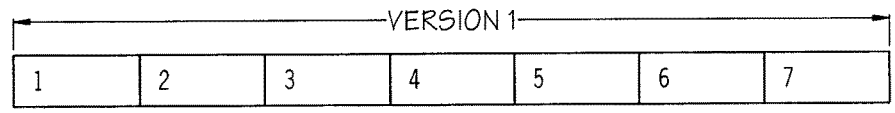
FIG. 4A
| SOURCE BLOCK | CLOUD BLOCK | COUNT | /-410 |
|---|---|---|---|
| 1 | 1 | 7 | |
FIG. 4B
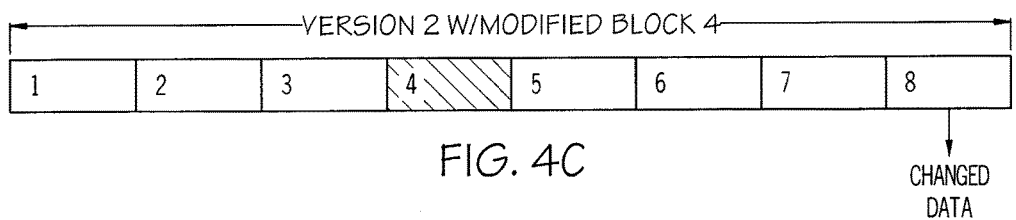
FIG. 4C
CHANGED DATA
| SOURCE BLOCK | CLOUD BLOCK | COUNT | /-420 |
|---|---|---|---|
| 1 | 1 | 3 | |
| 4 | 8 | 1 | |
| 5 | 5 | 3 | |
FIG. 4D

| STORAGE OBJECT | | | |
|---|---|---|---|
| 1 | | | |
| | SOURCE BLOCK | CLOUD/BACKUP BLOCK | COUNT |
| | 1 | 1 | 3 |
| 2 | | | |
| | SOURCE BLOCK | CLOUD BLOCK | COUNT |
| | 5 | 5 | 2 |
| 3 | | | |
| | SOURCE BLOCK | CLOUD BLOCK | COUNT |
| | 4 | 8 | 1 |
| | 7 | 7 | 1 |

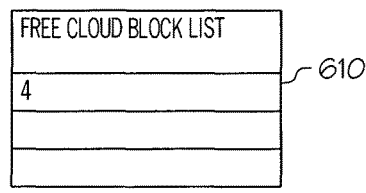
FIG. 6A
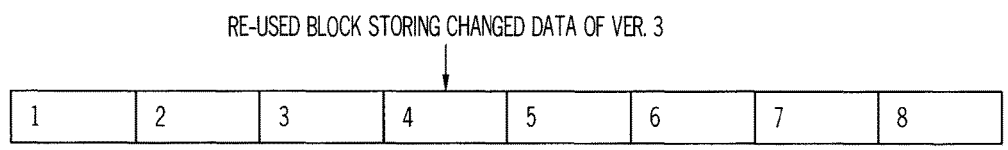
FIG. 6B
FILE META DATA FOR VERSION 3
| SOURCE BLOCK | CLOUD BLOCK | COUNT |
|---|---|---|
| 1 | 1 | 3 |
| 4 | 8 | 1 |
| 5 | 5 | 1 |
| 6 | 4 | 1 |
| 7 | 7 | 1 |
FIG. 6C

CLOUD-BASED DATA BACKUP AND MANAGEMENT

BACKGROUND

The present disclosure relates to data backup to an external, remote or secondary location (e.g., a disk in a cloud-based storage mechanism), such as block level data backup and management in a cloud-based storage mechanism.

SUMMARY

In general, various aspects discussed in this disclosure relate to managing units of storage, e.g., storage objects, in a data backup storage mechanism (interchangeably referred to herein as "data backup storage," "backup storage" or "backup device"). The data backup storage mechanism may include a data storage device, a data storage system or a data storage network to store, as a backup, data related to multiple versions of data files originating at one or more data sources. According to one aspect of the present disclosure, a method to manage a storage object in a data backup storage mechanism is provided. The method (e.g., executed by a processor) may include determining whether a number of free data blocks of the storage object exceeds a certain threshold. The method may also include determining whether a data block of the data file corresponding to a valid data block of the storage object has not been modified in at least a certain number of previous versions of the data file.

Responsive to or based on a result of the determination made in relation to the certain threshold and/or the determination made in relation to the certain number of previous versions, the method may further include copying data in the valid data block of the storage object to an unused data block in another storage object in the data backup storage mechanism, and updating a status of the valid data block to free data block such that all data blocks in the storage object are free data blocks. Once all the data blocks of the storage object are free data blocks, the storage object is made available for re-use to store new or additional data from one or more data sources.

The storage object may include a fixed or configurable total number of data blocks. The certain number of previous versions of the data file may include a certain number of consecutive previous versions of the data file, which were most-recently stored in the data backup storage mechanism prior to the operation of determining in relation to the certain number of previous versions.

In some embodiments, the operations of copying the data and updating the status are performed during the operation of storing of a next version of the data file in the data backup storage mechanism, i.e., after the operation of storing of the most-recent previous version of the data file which was performed prior to the operation of determining in relation to the certain number of previous versions.

In some embodiments, data related to a plurality of versions of the data file may be stored in a storage object in contiguous data blocks of the storage object in the order in which data of each version of the data file is received from the data source.

In some embodiment, a metadata file corresponding to each of the plurality of versions of the data file is stored (at the data backup storage mechanism). Each metadata file may include one or more selection from: a total data size of the corresponding version of the data file, a block size of data blocks of the corresponding version, and/or file-block allocation information of the corresponding version. The file-block allocation information may include a logical block number of a data block of the data file at the data source, a corresponding block number in the storage object corresponding to the logical block number, and/or number of data blocks which are contiguously stored in the storage object following the corresponding block number.

In some embodiments, the metadata files may be received from the data source at the data backup storage mechanism along with the data of the corresponding version of the data file. In some other embodiments, the metadata files may only be stored at the data source where the data files (and its various versions) are being hosted, originated, processed, and stored.

In some embodiments, the metadata files are used to merge different versions of the data file (without downloading or transferring the actual data of the data file from the backup storage to the data source) and restore a particular version of the data file. For example, to restore a particular version of the data file, the method further includes parsing the file-block allocation information of the metadata file of the (to-be-restored) particular version to determine the data blocks in the storage object which correspond to the particular version, and to determine the order in which those data blocks are to be accessed for version restoration. Once the corresponding data blocks and their order is determined, the data blocks are accessed and transmitted from the data backup storage in the determined order. The data source processes the received data blocks to restore the particular version.

Further, the data backup storage mechanism may be configured to store only up to a maximum number of versions of a data file. Accordingly, once that maximum number is met at the backup storage, (at least) two versions (e.g., consecutive versions) of the data file may be merged to eliminate one of those two versions, and thus make a storage space available for a new version of the data file. In some embodiments, to perform the merge operation, the method includes updating a status of valid data blocks of one of the two consecutive versions to free data blocks, and deleting the metadata file corresponding to the one of the two consecutive versions.

According to another aspect of the present disclosure, a system to manage a storage object in a data backup storage mechanism is provided. The processor may be configured to determine whether a number of free data blocks of the storage object exceeds a certain threshold, and determine whether a data block of the data file corresponding to a valid data block of the storage object has not been modified in at least a certain number of previous versions of the data file.

Responsive to or based on a result of the determination made in relation to the threshold and/or the determination made in relation to the number of previous versions, the processor is configured to copy data in the valid data block of the storage object to an unused data block in another storage object in the data backup storage mechanism, and update a status of the valid data block to free data block such that all data blocks in the storage object are free data blocks. Once all the data blocks of the storage object are free data blocks, the storage object is made available for re-use to store new or additional data from one or more data sources.

In some embodiments, data related to a plurality of versions of the data file may be stored in a storage object in contiguous data blocks of the storage object in the order in which data of each version of the data file is received from the data source.

The processor may be further configured to store (at the data backup storage mechanism) a metadata file corresponding to each of a plurality of versions of the data file. Each metadata file may include one or more selected from: a total data size of the corresponding version of the data file, a block size of data blocks of the corresponding version, and/or file-block allocation information of the corresponding version. The file-block allocation information may include a logical block number of a data block of the data file at the data source, a corresponding block number in the storage object corresponding to the logical block number, and/or a number of data blocks which are contiguously stored in the storage object following the corresponding block number.

In some embodiments, the metadata files are used to merge different versions of the data file (without downloading or transferring the actual data of the data file from the backup storage to the data source) and restore a particular version of the data file. For example, to restore a particular version of the data file at the data source, the processor may be configured to parse the file-block allocation information of the metadata file of the (to-be-restored) particular version to determine the data blocks in the storage object which correspond to the particular version, and to determine the order in which those data blocks are to be accessed for version restoration. Once the corresponding data blocks and their order is determined, the data blocks are accessed and transmitted from the data backup storage in the determined order. The processor may then process the received data blocks to restore the particular version.

Further, the data backup storage mechanism may be configured to store only up to a maximum number of versions of a data file. Accordingly, once that maximum number is met at the backup storage, (at least) two versions (e.g., consecutive versions) of the data file may be merged to eliminate one of those two versions, and thus make a storage space available for a new version of the data file. In some embodiments, to perform the merge operation, the processor is configured to update a status of valid data blocks of one of the two consecutive versions to free data blocks, and delete the metadata file corresponding to the one of the two consecutive versions.

According to another aspect of the present disclosure, a computer-readable medium including computer-executable instructions to manage a storage object in a data backup storage mechanism is provided. The instructions when executed by a processor cause the processor to implement one or more methods and/or systems presented in this disclosure.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

BRIEF DESCRIPTION OF THE DRAWINGS

Aspects of the present disclosure are illustrated by way of example and are not limited by the accompanying figures, with like references indicating like elements.

FIGS. 4A-4D show stored files and metadata files, according to various implementations.

FIG. 5 shows a block mapping table, according to various implementations.

FIGS. 6A-6C illustrate a mapping table, and file structure for file merge, according to various implementations.

DETAILED DESCRIPTION

Figure 1:
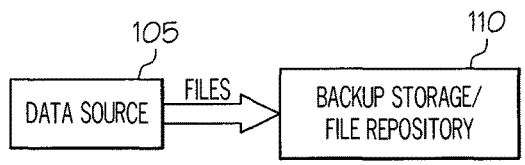
FIG. 1 illustrates an embodiment of a system to copy files, according to various implementations.

Typically, an operation to copy or move a data file or other data (e.g., File Copy operation in CA ARCserve® D2D software) from a data source to a destination system or device (e.g., a storage device) is based upon specified file-copy and retention criteria. As illustrated in FIG. 1, as part of a file copy operation, one or more data files (interchangeably referred to herein as "files") or other data may be copied or moved from data source 105 to backup storage or file repository 110 (e.g., a disk or cloud storage system) in, for example, a remote or geographically distant location. A primary purpose of such data copying or backup is to recover data after its loss, e.g., by data deletion or corruption. A secondary purpose of a data backup is to recover data from an earlier time, e.g., according to a user-defined data retention policy.

One or more advantages of copying files to a backup storage include: (a) improved efficiency in that such file copy processes help to speed backup and recovery processes by copying and moving unchanged data, and thereby reducing the amount of actual data being backed-up and stored to secondary storage; (b) meeting regulatory compliance, i.e., through file copying, important documents, emails, and other critical data can be preserved as necessary to comply with internal rules and external regulations; (c) reduced storage cost as storage capacity at the primary or source device (e.g., source 105) may be reclaimed by migrating older or infrequently accessed data from the data source to a more cost-effective archival storage system or device (e.g., storage 110); and/or (d) maintaining multiple file versions which allows a user to roll back to a previous version of a backed-up file (if necessary), or maintaining multiple versions of the same file at different destinations.

As an example of a copy process, for a File Copy job using CA ARCserve® D2D software, in each File Copy iteration, a version of one or more files at source 105 may be copied from source 105 to (one or more) storage 110 such that only the changed blocks of the file(s) corresponding to that version are copied. As such, multiple versions of each file at source 105 may be maintained in a backup storage, and version/recovery points for each file may be maintained at source 105. A user may be able to configure a limit to the number of versions to be backed up for each file, such that when that limit is met at storage 110, using the respective recovery points, two (or more) of the backed up versions (e.g., consecutive versions) of the file may be merged to create storage space for a new/next version.

Figure 2:
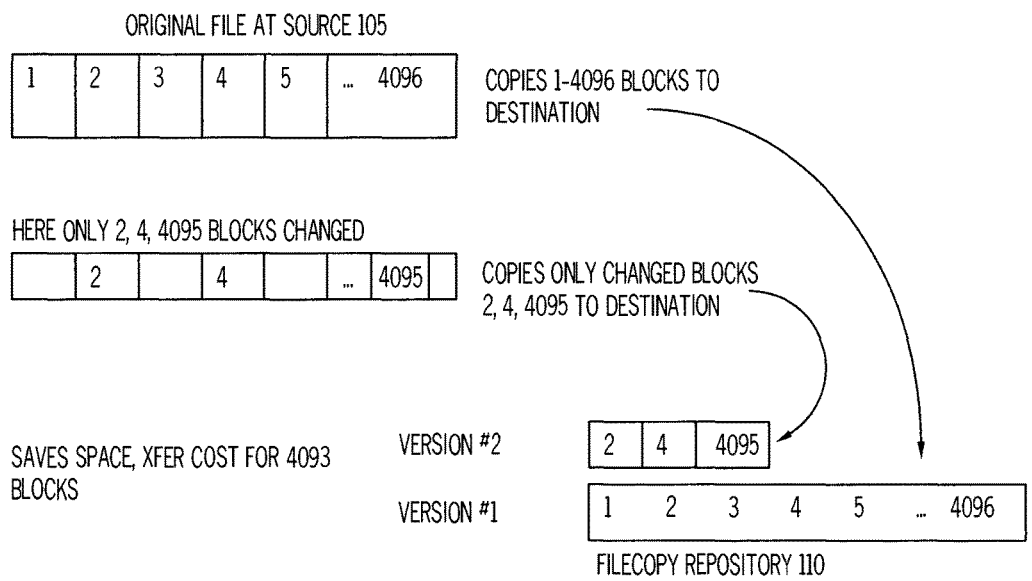
FIG. 2 illustrates data copying for multiple file versions, according to various implementations.

FIG. 2 illustrates an example of a File Copy process, in which, in a first File Copy iteration, a first (or original) version of a file at source 105 is copied from source 105 to storage or repository 110. For example, as illustrated, the file may have a total of 4096 data blocks (interchangeably referred to herein as "blocks"), each block of fixed size equal to, e.g., one megabyte (1 MB), and all the blocks (e.g., 4096 blocks) are copied from source 105 to storage 110 in the first iteration. Subsequently, the file may be edited or updated at source 105 such that one or more of its data blocks (e.g., blocks 2, 4, and 4095) are changed (i.e., contain changed data). As such, In a second (or subsequent) File Copy iteration, as a second version of the data file, only changed blocks, i.e., blocks 2, 4, and 4095 are copied from source 105 to storage 110. The above-discussed process of block-level copying only the changed blocks may be repeated for each version of each file at source 105, and thus multiple versions (up to a maximum number) of each source file may be maintained at the backup storage.

As discussed above, when the limit for the number of versions for a file at the backup storage is reached, (at least) two versions of the file may need to be merged to create storage space for a new version. For example, to merge version 2 of the file with its parent or base version 1, the complete data in version 2 (stored at storage 110) is merged with the data of version 1 (also at storage 110). In an embodiment, the complete data and metadata (i.e., information identifying the blocks for each version) for both version 1 and version 2 are transferred from storage 110 to source 105, and the data and metadata are combined at source 105 (e.g., by a processor therein). Subsequently, the merged version is transferred or copied back from source 105 to storage 110.

The above merge process is executed for every file which is stored at one or more storage devices 110 and has a maximum limit on the number of versions set up. Accordingly, for a large number of files, the total amount of data which is downloaded from the backup storage to the data source, processed, and then uploaded back to the backup storage as part of many version-merge processes may result in inefficient use of the data backup system, and increased computational and cost complexity. For example, for every file download and/or upload action, there may be a specific financial cost associated (e.g., storage rates may be set according to the amount of data downloaded from or uploaded at the backup storage). As such, for a large total number of merge operations for a large number of files (involving a large amount of data transfer), the total cost (e.g., per month, week, etc.) to use the backup storage may get prohibitively high for a user of the data backup system.

Further, in a restore process, e.g., to restore the latest version of a file at its source (e.g., source 105), metadata files for all the versions of the file may need to be coalesced at the source to recover the latest version of the file. Thus, if there are one million files at the data source, each of which has 40 versions stored at the backup storage and the latest version of each of which is being restored, then, in totality, the operation to coalesce the metadata is repeated 40 million times for the complete restore operation. This adds significant time and computational complexity, and increases the recovery time objective (RTO).

In accordance with various embodiments of this disclosure, systems and methods are described, which do not involve transferring large amounts of data or metadata files from the backup storage to a data source for merging file versions, or performing logical coalescing of metadata for all the file versions and for every file to restore a file version.

Figure 3:
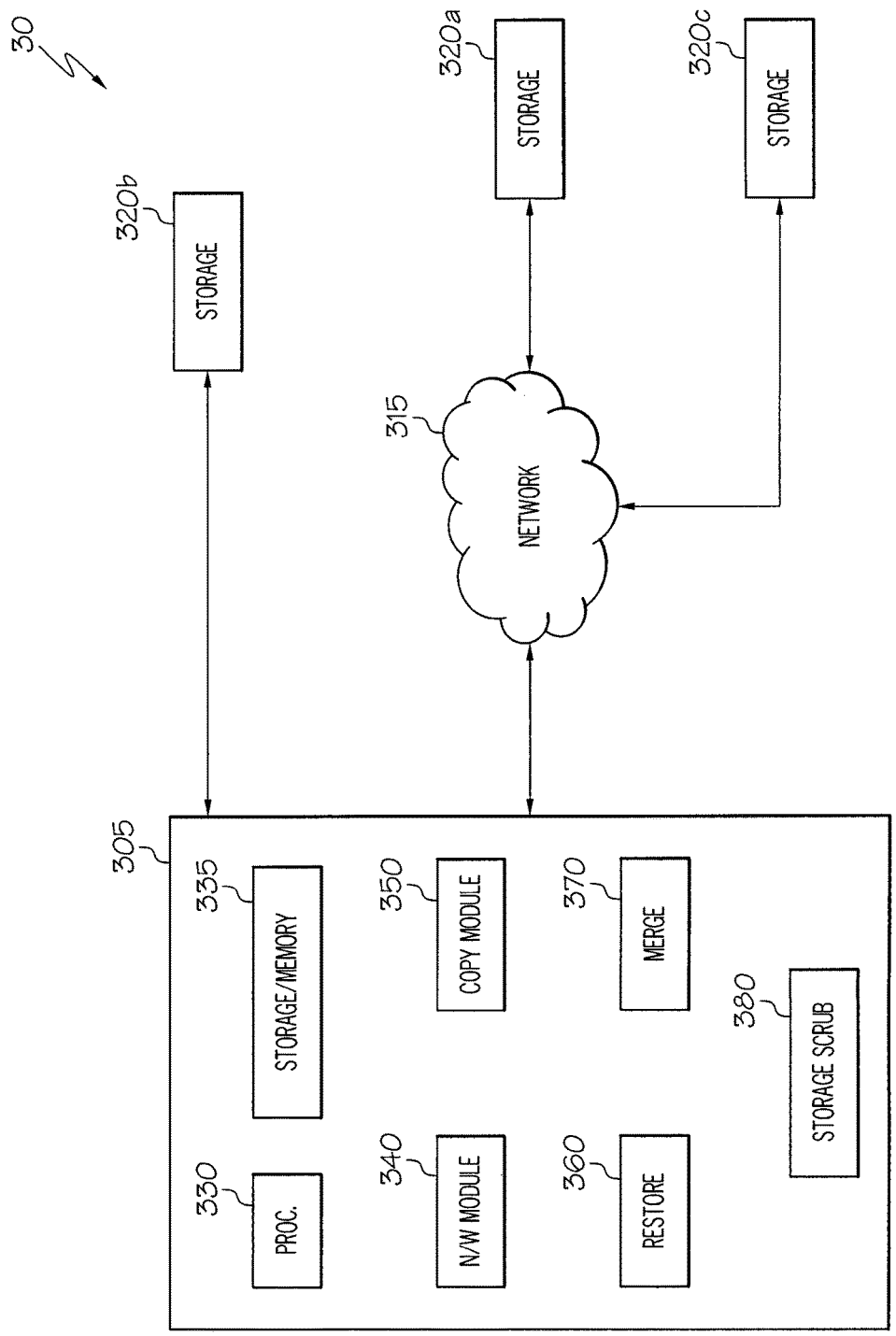
FIG. 3 illustrates an embodiment of a system to backup files and manage storage, according to various implementations.

FIG. 3 illustrates a block diagram of a system 30 to backup data files or other data, and manage data and storage in accordance with various embodiments of this disclosure. System 30 may include one or more data source devices 305, one or more backup storage devices 320, and a network 315 communicatively coupling source device 305 to backup storage device 320. Network 315 includes an interconnecting system capable of transmitting audio, video, data, or any combination of signals. For example, network 315 may include all, or a portion of, a public switched telephone network (PSTN), a public or private network, a local area network (LAN), a wide area network (WAN), a wired or wireless internet protocol (IP)-based network, the Internet, a cellular network based on the second generation (2G), third generation (3G) or fourth generation (4G) technologies, and/or other suitable wired or wireless communication networks.

Data source device 305 may be any computing device such as, for example, a server, a desktop computer, a laptop computer, a personal digital assistant, a smart phone, and/or any other computing device, and may use any conventional operating system, such as MS Windows®, UNIX/Linux®, or any other appropriate desktop or mobile operating system currently available or developed in the future. In the context of this disclosure, source device 305 may be a computing/processing device using which a user may at least create, edit, update or otherwise process, store and communicate (with other devices) data files and other data as well as their metadata. For example, for data backup and file copy purposes, device 305 may be configured to communicate and exchange data of files (created and stored at device 305) with storage device 320 either via direct connection(s) therebetween or via one or more networks 315.

Backup storage device 320 may include electronic storage media that electronically and non-transiently stores information, e.g., data files and their metadata received from source device 305. The electronic storage media of storage device 320 may include one or both of system storage (e.g., a disk) that is provided integrally (i.e., substantially non-removable) with device 320 and/or removable storage that is removably connectable to device 320 via, for example, a port (e.g., a USB port, a firewire port, etc.) or a drive (e.g., a disk drive, etc.). Storage device 320 may include one or more selected from: optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Storage device 320 may include or be connectively operational with one or more virtual storage resources (e.g., cloud storage, a virtual private network, and/or other virtual storage resources). Further, storage device 320 may store software algorithms, or any other information, e.g., provided by source device 305.

In some embodiments, storage device 320 may be a part of a storage area network (SAN) networked with source device 305. Being part of a SAN, storage device 320 may increase storage capacity utilization of source device 305 by attaching its storage space to device 305 in such a way that the storage of device 320 appears as locally attached to or within device 305. The SAN model places storage on its own dedicated network, which generally uses fiber channel technology. The SAN includes one or more hosts that interface with a local area network (LAN), SAN hubs, and other devices to accommodate a large number of storage devices. The hardware that connects workstations and servers to storage devices in a SAN is referred to as a "SAN fabric," where the hardware includes fabric switches, hubs, and similar equipment. The SAN model is often used to perform a LAN-free and server-free tape backup, storage leasing, and similar tasks. The SAN may include one or more storage sub-systems (e.g., including storage devices 320), which may include magnetic disks, magnetic tapes, optical discs, or a combination such as disk arrays, tape libraries, and optical jukeboxes. Furthermore, fiber channel connections may be used to connect the SAN with other devices like source device 305 and/or other storage systems or devices.

In some embodiments, storage device 320 (and source device 305) may include a disk file repository, which facilitates storage of disk files from various sources. Disk file systems are designed to store files on a data storage device, most commonly a disk or solid state drive, which may be directly or indirectly connected to the computer. Disk file systems are generally either journal file systems or versioning file systems. Journal file systems may log changes to a journal before committing them to the main file system, while versioning file systems allow a computer file to simultaneously exist in several versions.

In some embodiments, data at storage device 320 is stored as storage objects (provided by cloud vendors such as Amazon S3™ or Windows Azure™ Blob Storage), where a storage object (interchangeably referred to herein as "object" or "cloud object") is defined as a unit of storage at the storage device. Additionally or alternatively, data at storage device 320 may be stored in a data container, a data structure or abstract data type whose instances are collections of other objects.

A storage object may include a fixed or configurable number of data blocks to store one or more versions of each of one or more data files (from data source 305). For example, if a storage object is configured to include storage for three data blocks (each of size, say, 1 MB), then a data file of size 7 MB having seven data blocks will be stored in three objects—a first object storing the first three data blocks, a second object storing the second three data blocks, and a third object storing the last data block of the data file (with the two remaining data blocks of the third object being 'empty' or unused).

Referring again to device 305, in some implementations, device 305 includes a processor or a processing device or module 330, storage or memory device 335, a network module 340, a copy or backup module 350, a version restore module 360, a merge module 370, a storage scrubbing module 380 and/or other modules or devices. In some embodiments, one or more modules of device 305, e.g., modules 350, 360, 370, 380, may be part of a file copying or data backup product, e.g., CA ARCserve® D2D, operational with device 305.

Processor 330 may be configured to perform or execute some or all of the functionality of the various modules of device 305 as described herein in detail below. Processor 330 may include one or more selected from: a digital processor, an analog processor, a digital circuit designed to process information, an analog circuit designed to process information, a state machine, and/or other mechanism configured to electronically process information. Although processor 330 is shown in FIG. 3 as a single entity, this is not intended to be limiting, as processor 330 may include a plurality of processors operating in coordination or cooperation. This may include implementations in which device 305 includes a multi-processor device, a farm of server devices operating together, and/or virtual resources provided by the cloud. Processor 330 may be configured to execute the various modules of device 305 by software, hardware, firmware, or some combination thereof; and/or other mechanisms for configuring processing capabilities on processor 330.

In some implementations, storage or memory 335 includes a non-transitory, tangible computer-readable storage medium with various data (e.g., data files, metadata files), information and executable programs stored thereon. One of the stored programs may be designed to instruct processor 330 to perform some or all of the functionality of the modules discussed in this disclosure. Storage 335 may include system storage that is provided integrally (i.e., substantially non-removable) with device 305 and/or removable storage that is removably connectable to device 305 via, for example, a port (e.g., a USB port, a firewire port, etc.) or a drive (e.g., a disk drive, etc.). Storage 335 may include one or more selected from: optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Storage 335 may include one or more virtual storage resources (e.g., cloud storage, a virtual private network, and/or other virtual storage resources).

Network module 340 may be configured to transmit and receive information (e.g., data files, metadata files, etc.) between device 305 and storage device 320 (and/or other devices within or external to system 30). For example, network module 340 may be configured to maintain one or more electronic communication links between various devices either via direct connections therebetween or via network 315. As such, network module 340 may be configured to support various different communication protocols to communicate over various network wired or wireless links.

In some embodiments, copy or backup module 350 is configured to execute file copy or backup operations in which one or more versions of one or more data files at source device 305 (e.g., stored in storage 335) are copied or moved from source device 305 to the storage device 320. For example, in a first iteration when a file is being backed up for the first time, copy or backup module 350 transmits the complete original file as the first version of the file to storage 320. Subsequently, at each file-copy iteration, if the data file was updated since the previous iteration, backup module 350 transmits a new version of the data file from source 305 to storage 320 including only the changed or updated data blocks of the file corresponding to that version. As such, module 350 may be able to copy or back up multiple versions of the file at source 305 to backup storage 320. A maximum number of versions for a data file that are backed up may be configured, e.g., using module 350.

At storage 320, data related to a plurality of versions of the data file transmitted from device 305 may be stored in one or more storage objects. For example, the file versions may be stored in contiguous data blocks of a storage object such that there is no data block in the storage object between two consecutive file versions. Moreover, the file versions may be stored in the storage object in the order in which data of each version is received from data source device 305.

Further, as part of the file copy operation, copy or backup module 350 may create a metadata file for each version of a data file. Each metadata file may include one or more selected from: a total data size of the corresponding version of the data file, standard file information, a block size of data blocks of the corresponding version, and/or file-block allocation information of the corresponding version. The file-block allocation information may include a logical block number of a data block of the data file at the data source, a corresponding block number in the storage object corresponding to the logical block number, and/or number of data blocks which are contiguously stored in the storage object following the corresponding block number.

The metadata files for a data file may be named as X.MetaData1 for a first version, X.MetaData2 for a second version, and so on, where 'X' is the file name, and stored in storage 335. In addition to, or instead of, storing the metadata files at source device 305, module 350 may send instructions to processor 330 to transmit the metadata files from source 305 (or storage 335) to storage 320 along with the data of the corresponding version of the data file. As such, copies of the metadata files may also be stored in storage objects (other than the objects having the file data) of storage 320.

As an example of the functioning of backup module 350, consider a data file including seven data blocks at data source device 305. Initially, as the first version of the file, module 350 may transmit all seven blocks to device 320 for storing in a storage object thereof. FIG. 4A illustrates the first version ("Ver. 1") of the file stored in the storage object. During the same iteration of the file copy process, module 350 may also create a metadata file 410 for Ver. 1, which is illustrated in FIG. 4B. The metadata file includes information that the data of Ver. 1 of the file starts at the logical block number 1 ("DBN 1") at the data source 305, has seven contiguous blocks including and following DBN 1, and is stored at storage device 320 starting at cloud/backup block number 1 ("BBN 1").

Subsequent to the first iteration, if the file at source device 305 is changed at DBN 4, then, in the next iteration, module 350 only transmits the updated or changed data of DBN 4 as Ver. 2 of the data file to device 320, where the updated data (of original DBN 4) is appended to the last data block of Ver. 1. FIG. 4C illustrates the updated data file at storage 320 including Ver. 1 (from BBN 1 through BBN 7) and Ver. 2 (BBN 8) of the data file.

Module 350 may create a metadata file 420 for Ver. 2, which is illustrated in FIG. 4D. Metadata file 420 indicates that, in Ver. 2 of the source file, data block offset of DBN 1 to DBN 3 are contiguous and those blocks are stored starting from BBN 1 at storage 320; data block offset of DBN 4 is stored at BBN 8; and data block offset of DBN 5 to DBN 7 are contiguous and stored starting from BBN 5. Module 350 may repeat the above-described process of transmitting the changed data to storage device 320 as a new file version (to be appended to the previous version), and also creating and/or transmitting the corresponding metadata file at each iteration of the file copy process.

In some embodiments, version restore module 360 restores a particular version of a data file, e.g., automatically or in response to a request of a user at device 305. Generally, to restore a particular version of the data file (e.g., Ver. 2 described above) at the data source device 305, module 360 may parse the file-block allocation information of the metadata file, e.g., metadata file 420 of Ver. 2, to identify the specific backed up data blocks in storage 320 that correspond to Ver. 2, and to determine the order in which those specific data blocks are to be accessed and downloaded at device 305 for version restoration. Once the corresponding data blocks and their order is determined, only the identified data blocks are accessed and transmitted back from data backup storage device 320 to data source device 305 in the determined order. Processor 330 and restore module 360 may process the received data blocks to restore the file per Ver. 2.

In some embodiments, for example, to restore a Ver. 2 of the data file, first, module 360 generates a mapping table 510 (shown in FIG. 5) in terms of the storage objects. To get this table, module 360 divides the total number of blocks in the backed up Ver. 2 data file (i.e., equal to 8 in this example) with the size of the storage object (i.e., equal to 3 in this example) to compute the number of objects (i.e., equal to 3 in this case) at device 320 for storing Ver. 2. Then, module 360 parses over metadata file 420 to generate a mapping between source blocks and backup blocks for each storage object.

Once the information as ordered by the storage object index is generated, module 360 iterates over the storage object index table, and for each storage object, restores the corresponding blocks by (a) downloading the data from that storage object into a data buffer at device 305; (b) seeking the restore-file offset corresponding to source data block established in the table; and (c) writing the 'count' number of blocks (as in the table) with the data received in the buffer.

For example, based on the generated table 510, module 360 downloads the storage object number 1 including three backed up data blocks (BBN 1-BBN 3), and restores the first part of the data file starting at DBN 1 by accessing and writing the three downloaded contiguous blocks into DBN1-DBN3 of the restored file. Further, module 360 downloads the storage object number 2 including the next three backed up data blocks (BBN 4-BBN 6), and restores the second part of the data file starting at DBN 5 by accessing and writing the two of the three downloaded blocks (i.e., BBN 5 and BBN 6) of object 2 into DBN 5 and DBN 6 of the restored file. Finally, module 360 downloads the storage object number 3 also including three backed up data blocks (BBN 7-BBN 9), and restores the third and final part of the data file by accessing and writing the data at BBN 8 into DBN 4 and the data at BBN 7 into DBN 7 of the restored file.

As discussed above, when the maximum limit for the number of versions for a file at backup storage 320 is reached, (at least) two (consecutive or non-consecutive) versions of the file are merged to create storage space for a new/subsequent version. For example, if the maximum version limit is equal to two, and two versions of the data file are already backed up at device 320 (as shown in FIG. 4C), merge module 370 merges Ver. 2 with Ver. 1 of the file, e.g., as part of and during an iteration of the file copy process executed by copy module 350, when it is determined that a new version (Ver. 3) of the file is to be backed up at storage 320.

In some embodiments, merge module 370 performs the merge operation using the metadata files of the two file versions being merged. Specifically, to merge two versions, module 370 may update or modify an existing status (create a new status) of one or more data blocks of one of the two file versions, and delete the metadata file corresponding to that one of the two file versions.

In the context of this disclosure, certain data blocks of the storage object at storage device 320 are defined as (or have a status as) 'free' data blocks to indicate that such data blocks are or were storing backup data of a source data file, but are now available for re-use to store new or additional data of that or any other data file. Further, some data blocks of the object are defined as (or have a status as) 'valid' data blocks to indicate that such data blocks are storing backup data corresponding to one or more active, existing or restorable versions of the data file, and their data may not be written over. Also, some of the object's data blocks are defined as (or have a status as) 'empty' or 'unused' data blocks to indicate that such data blocks are not currently storing any data and are available to store backup data.

In some embodiments, to merge two versions, merge module 370 parses the metadata files of the two versions, and based on the metadata information, indicates that the status of all the blocks that got modified from the earlier of the two versions to the later version as 'free', and deletes the metadata file of the earlier version. For example, to merge Ver. 2 with Ver. 1, module 370 parses the metadata files 410, 420 to determine that data block number 4 (DBN 4) got modified from Ver. 1 to Ver. 2 (and the changed DBN 4 is stored at BBN 8), and indicates that the block at BBN 4 which stored the original data of DBN 4 is now 'free'. For example, merge module 370 may generate and maintain a "Free Block List" table 610 (in memory 335), illustrated in FIG. 6A, which includes the block numbers of the storage object (e.g., BBN 4) defined as free due to the merge operation. Merge module 370 may also delete the metadata file for Ver. 1, i.e., file 410 from the storage at device 305 as well as at device 320.

The free data blocks in a storage object at device 320 may be used to store backup data for a new version of the same data file or a different data file from source device 305. For example, during a subsequent file copy iteration, if there is a new version with modified blocks of the data file, copy module 350 may first check if there is any storage block number in table 610, and if there are one or more blocks indicated as free in that table, copy module 350 may utilize those blocks to store data of the new version. For example, if Ver. 3 of the file (original shown in FIG. 4A) includes modified DBN 6, copy module 350 may use BBN 4, which in the above scenario was defined as 'free' in table 610, to store the modified DBN 6, instead of appending it at the end of Ver. 2 (i.e., following BBN 8 in FIG. 4C). The modified data file at storage device 320 including only Ver. 2 and Ver. 3 data is shown in FIG. 6B, and the metadata file for Ver. 3 is shown in FIG. 6C. In some embodiments, if all blocks of a storage object are set as free (due to one or more version merge operations), then the data of the whole object may be completely deleted without waiting for a next version of a file to use the free blocks of the storage object.

A storage object may have one or more free blocks (with the remaining blocks as valid blocks), but those free blocks may not be re-useable to store new data until all the blocks of that storage object are defined as free. This reduces the overall efficiency of the storage device 320. Accordingly, in some embodiments, to make such free blocks of a storage object re-usable, scrubbing module 380 is configured to determine whether the number of free data blocks of the storage object (e.g., in terms of an actual number of free blocks, or a percentage of the total blocks) exceeds a certain threshold (e.g., more than 2 free blocks or more than 5% free).

Scrubbing module 380 may also determine whether the 'valid' data blocks of the storage object have not been modified in at least a certain number of previous versions of the data file. For example, module 380 may compute, for all the valid blocks of the object, an average (or any other statistical measure) of the number of previous versions in which those valid blocks have not been modified at source device 305. Module 380 may then determine if that average number of previous versions exceeds a certain version count (e.g., 2, 3 or higher). The previous versions which are included in computing the average may include consecutive previous versions of the data file, which were most-recently backed up at device 320, e.g., prior to the operation of computing such average.

Module 380 may make the above two determinations using the metadata files of the existing versions as well as the information in the table 610. If It is determined that the number of free data blocks of the storage object exceeds the certain threshold and/or the average number of previous versions exceeds the certain version count, module 380 may move the data of the valid blocks of that storage object to another storage object (e.g., within the same storage device 320), and change the status of the moved valid blocks to free, e.g., by adding the block numbers (BBNs) of the valid blocks into the Free Block List table 610. In this way, all the blocks of that storage object are now free to be re-used to store new data for new file versions.

To move the data of the valid blocks, module 380 may mark the data blocks in the data file (at device 305) corresponding to those valid blocks (at device 320) as modified. Thus, during subsequent file copy iteration, module 350 may create a new version including those "modified" blocks (and other actually modified block(s)) and a metadata file of the new version, and transmit the new file version (and its metadata file) to be stored in unused data blocks of a storage object other than the storage object to which the valid blocks initially belonged. Then, module 380 adds the backup block numbers, BBNs, of the moved valid blocks into the Free Block List table 610, thus indicating that the entire storage object is now free for re-use for data backup purposes.

It should be appreciated that although modules 340, 350, 360, 370, 380 are illustrated in FIG. 3 as being co-located within a single processing unit, in implementations in which processor 330 includes multiple processing units, one or more of modules 340, 350, 360, 370, 380 may be located remotely from the other modules. The description of the functionality of the different modules 340, 350, 360, 370, 380 provided in this disclosure is for illustrative purposes, and is not intended to be limiting, as any of modules 340, 350, 360, 370, 380 may provide more or less functionality than is described. For example, one or more of modules 340, 350, 360, 370, 380 may be eliminated, and some or all of its functionality may be provided by other ones of modules 340, 350, 360, 370, 380. As another example, processor 330 may be configured to execute one or more additional modules that may perform some or all of the functionality attributed below to one of modules 340, 350, 360, 370, 380.

It will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CU, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
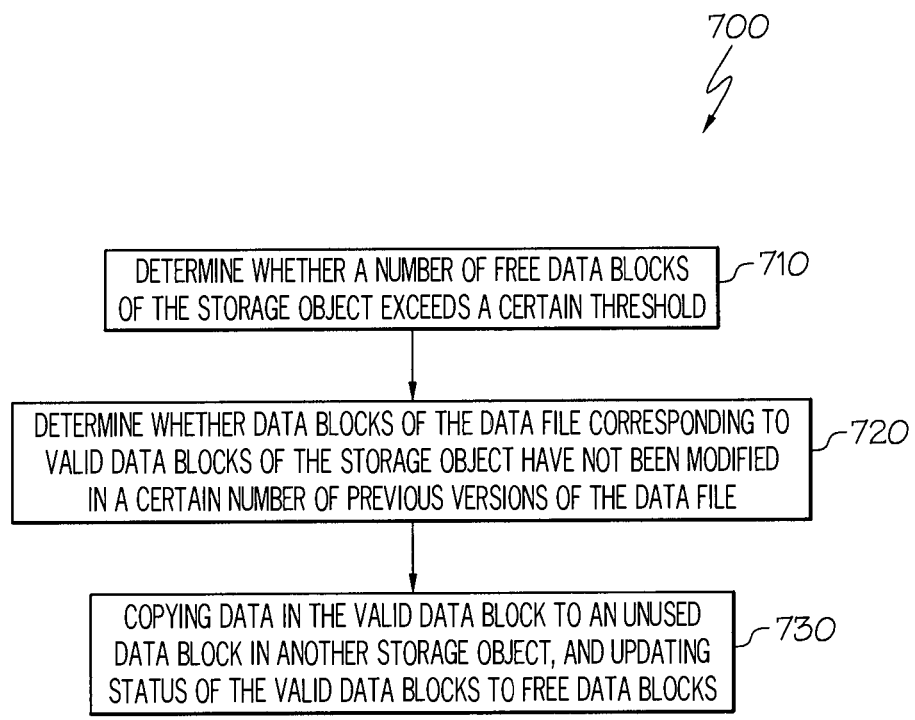
FIG. 7 illustrates an embodiment of a method to backup files and manage storage, according to various implementations.

FIG. 7 illustrates a method 700 to efficiently manage usage of blocks of a storage object. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 710, it is determined, e.g., by module 380, whether a number of free data blocks of the storage object exceeds a certain threshold.

At an operation 720, it is determined, e.g., by module 380, whether one or more data blocks of the data file corresponding to valid data blocks of the storage object have not been modified in at least a certain number of previous versions of the data file.

At an operation 730, responsive to the determining in relation to the certain threshold and/or the determining in relation to the certain number of previous versions, data in the valid data blocks of the storage object may be copied or moved, e.g., using modules 350, 380, to unused data blocks in another storage object. In the same operation, using module 380, the status of the valid data blocks may be changed to 'free', e.g., by adding those block numbers in the table 610, such that all data blocks in the storage object are free data blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operation's, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A method to manage a data backup storage mechanism, the method comprising:
    obtaining access to a backup data storage mechanism, wherein:
        the data backup storage mechanism is configured to store data related to a plurality of versions of a data file received from a data source,
        the data backup storage mechanism is configured to store data in a plurality of storage objects, each storage object being a unit of a separate plurality of data blocks within the data backup storage mechanism, and
        the backup storage mechanism is configured to create a metadata record for each version of a data file, the metadata record including file-block allocation information,
    determining, by a hardware processor system, whether a number of free data blocks a storage object of the plurality of storage objects exceeds a threshold, wherein the storage object has a storage capacity less than that of the data backup storage mechanism;
    determining, by the hardware processor system, whether a data block of the data file at the data source corresponding to a valid data block of the storage object has not been modified in at least two previous versions of the data file;
    responsive to determining that the number of free data blocks of the storage object exceeds the threshold and/or determining that the data block of the data file at the data source corresponding to the valid data block of the storage object has not been modified in at least two previous versions of the data file:
        copying data in the valid data block of the storage object to an unused data block in another storage object of the plurality of storage objects in the data backup storage mechanism, and
        updating a status of the valid data block to free data block such that all data blocks in the storage object are free data blocks;
    merging, by the hardware processor system, two consecutive versions of the data file to eliminate one of those two versions and modifying the metadata record corresponding to the one of the two consecutive versions to account for the merging; and
    restoring, by the hardware processor system, a given version of the data file by parsing file-block allocation information of a metadata file record of the given version of the data file to determine the data blocks in the storage object corresponding to the given version and the order in which the data blocks are to be accessed for restoration of the given version of the data file.

2. The method of claim 1, wherein the storage object comprises a fixed total number of data blocks.

3. The method of claim 1, wherein the at least two versions of the data file comprises a certain number of consecutive previous versions of the data file most-recently stored in the data backup storage mechanism prior to the determining in relation to the at least two previous versions.

4. The method of claim 1, wherein the copying and the updating are performed during storing of a next version of the data file in the data backup storage mechanism after the storing of the most recent previous version of the data file prior to the determining in relation to the at least two previous versions.

5. The method of claim 1, further comprising storing a metadata file corresponding to each of a plurality of versions of the data file, the metadata file comprising a total data size of the corresponding version of the data file, a block size of data blocks of the corresponding version, and/or file-block allocation information of the corresponding version,
    wherein the file-block allocation information comprises a logical block number of a data block of the data file at the data source, a corresponding block number in the storage object corresponding to the logical block number, and/or a number of data blocks which are contiguously stored in the storage object following the corresponding block number.

6. The method of claim 5, wherein the metadata file is received from the data source along with the data of the corresponding version of the data file.

7. The method of claim 5, further comprising:
    responsive to the data backup storage mechanism storing data related to a maximum number of versions of the data file, merging two consecutive versions of the data file,
        wherein-merging comprises updating a status of valid data blocks of one of the two consecutive versions to free data blocks, and deleting the metadata file corresponding to the one of the two consecutive versions.

8. The method of claim 5, further comprising:
    receiving the data blocks in the determined order from the data backup storage mechanism to restore the particular version of the data file.

9. The method of claim 1, wherein free blocks of the storage object are not re-useable to store new data until all the blocks of the storage object are defined as free.

10. The method of claim 1, wherein each of the objects is a data structure stored in the data backup storage mechanism.

11. A system to manage a backup data storage mechanism, the system comprising a hardware processor system configured to:
obtain access to a backup data storage mechanism, wherein:
the data backup storage mechanism is configured to store data related to a plurality of versions of a data file received from a data source,
the data backup storage mechanism is configured to store data in a plurality of storage objects, each storage object being a unit of a separate plurality of data blocks within the data backup storage mechanism, and
the backup storage mechanism is configured to create a metadata record for each version of a data file, the metadata record including file-block allocation information,
determine whether a number of free data blocks of a storage object of the plurality of storage objects exceeds a certain threshold, wherein the storage object has a storage capacity less than of the data backup storage mechanism;
determine whether a data block of the data file at the data source corresponding to a valid data block of the storage object has not been modified in at least two previous versions of the data file; and
responsive to a determination that the number of free data blocks of the storage object exceeds the certain threshold and/or determination that the data block of the data file at the data source corresponding to the valid data block of the storage object has not been modified in at least two previous versions of the data file,
copy data in the valid data block of the storage object to an unused data block in another storage object of the plurality of storage objects in the data backup storage mechanism, and
update a status of the valid data block to free data block such that all data blocks in the storage object are free data blocks
merge two consecutive versions of the data file to eliminate one of those two versions and modifying the metadata record corresponding to the one of the two consecutive versions to account for the merging; and
restore a given version of the data file by parsing file-block allocation information of a metadata file record of the given version of the data file to determine the data blocks in the storage object corresponding to the given version and the order in which the data blocks are to be accessed for restoration of the given version of the data file.

12. The system of claim 11, wherein the storage object comprises a fixed total number of data blocks.

13. The system of claim 11, wherein the at least two previous versions of the data file comprises a certain number of consecutive previous versions of the data file most-recently stored in the data backup storage mechanism prior to the determination in relation to the at least two previous versions.

14. The system of claim 11, wherein the hardware processor system is further configured to copy the data and upload the status during storing of a next version of the data file in the data backup storage mechanism after the storing of most-recent previous version of the data file prior to the determination in relation to the at least two previous versions.

15. The system of claim 11, wherein the hardware processor system is further configured to store a metadata file corresponding to each of a plurality of versions of the data file,
the metadata file comprising a total data size of the corresponding version of the data file, a block size of data blocks of the corresponding version, and/or file-block allocation information of the corresponding version,
wherein the file-block allocation information comprises a logical block number of a data block of the data file at the data source, a corresponding block number in the storage object corresponding to the logical block number, and/or a number of data blocks which are contiguously stored in the storage object following the corresponding block number.

16. The system of claim 15, wherein the metadata file is received from the data source along with the data of the corresponding version of the data file.

17. The system of claim 15, wherein the hardware processor system is further configured to:
responsive to the data backup storage mechanism storing data related to a maximum number of versions of the data file, merge two consecutive versions of the data file,
wherein merging comprises to updating a status of valid data blocks of one of the two consecutive versions to free data blocks, and delete the metadata file corresponding to the one of the two consecutive versions.

18. The system of claim 15, wherein the hardware processor system is further configured to:
receive the data blocks in the determined order from the data backup storage mechanism to restore the particular version of the data file.

19. The system of claim 11, wherein free blocks of the storage object are not re-useable to store new data until all the blocks of the storage object are defined as free.

20. The system of claim 11, wherein each of the objects is a data structure stored in the data backup storage mechanism.

21. A tangible, non-transitory, machine readable medium storing instructions that when executed by one or more processors effectuate operating comprising
obtaining access to a backup storage mechanism wherein:
the data backup storage mechanism configured to store data related to a plurality of versions of a data file received from a data source,
the data backup storage mechanism configured to store data in the plurality of storage objects, each storage object being a unit of a separate plurality of data blocks within the data backup storage mechanism,
determining whether a number of free data blocks of a storage object of a plurality of storage objects in a data backup storage mechanism exceeds a certain threshold, and the storage object having a storage capacity less than that of the data backup storage mechanism;
determining whether a data block of the data file at the data source corresponding to a valid data block of the storage object has not been modified in at least two previous versions of the data file;
responsive to a determination that the number of free data blocks of the storage object exceeds the certain threshold and/or a determination that the data block of the data file at the data source corresponding to the valid data block of the storage object has not been modified in at least two previous versions of the data file, copying data in the valid data block of the storage object to an unused data block in another storage object of the plurality of storage objects in the data backup storage mechanism;

updating a status of the valid data block to free data block such that all data blocks in the storage object are free data blocks merging, by the hardware processor system, two consecutive versions of the data file to eliminate one of those two versions and modifying the metadata record corresponding to the one of the two consecutive versions to account for the merging; and restoring, by the hardware processor system, a given version of the data file by parsing file-block allocation information of a metadata file record of the given version of the data file to determine the data blocks in the storage object corresponding to the given version and the order in which the data blocks are to be accessed for restoration of the given version of the data file.

22. The medium of claim 21, wherein the storage object comprises a fixed total number of data blocks.

23. The medium of claim 21, wherein the at least two previous versions of the data file comprises a certain number of consecutive previous versions of the data file most-recently stored in the data backup storage mechanism prior to the determination in relation to the at least two previous versions.

24. The medium of claim 21, wherein the instructions further comprises:
    copying the data and update the status during storing of a next version of the data file in the data backup storage mechanism after the storing of most-recent previous version of the data file prior to the determination in relation to the at least two previous versions.

25. The medium of claim 21, wherein the instructions further comprise:
    storing a metadata file corresponding to each of a plurality of versions of the data file,
        the metadata file comprising a total data size of the corresponding version of the data file, a block size of data blocks of the corresponding version, and/or file-block allocation information of the corresponding version,
        wherein the file-block allocation information comprises a logical block number of a data block of the data file at the data source, a corresponding block number in the storage object corresponding to the logical block number, and/or a number of data blocks which are contiguously stored in the storage object following the corresponding block number.

26. The medium of claim 25, wherein the metadata file is received from the data source along with the data of the corresponding version of the data file.

27. The medium of claim 25, wherein the instruction further comprise:
    responsive to the data backup storage storing data related to a maximum number of versions of the data file, merge two consecutive versions of the data file,
        wherein merging comprises updating a status of valid data blocks of one of the two consecutive versions to free data blocks, and delete the meta data file corresponding to the one of the two consecutive versions.

28. The medium of claim 25, wherein the instructions further comprise:
    receiving the data blocks in the determined order from the backup storage mechanism.

29. The medium of claim 21, wherein free blocks of the storage object are not re-useable to store new data until all the blocks of the storage object are defined as free.

* * * * *